United States Patent [19]

Cleveland

[11] Patent Number: 5,142,288
[45] Date of Patent: Aug. 25, 1992

[54] ELECTRO-OPTICAL IFF SYSTEM

[76] Inventor: William C. Cleveland, 1191 Triumphal Way, Santa Ana, Calif. 92705

[21] Appl. No.: 131,881

[22] Filed: Dec. 11, 1987

[51] Int. Cl.$^5$ .............................................. H04B 9/00
[52] U.S. Cl. ...................................... 342/45; 359/154
[58] Field of Search ................... 342/45; 455/604, 605

[56] References Cited

U.S. PATENT DOCUMENTS

| | | | |
|---|---|---|---|
| 2,720,644 | 10/1955 | Bartelink | 342/45 |
| 2,796,602 | 6/1957 | Hess et al. | 342/45 |
| 3,226,716 | 12/1965 | Humpherys | 342/45 |
| 3,750,163 | 7/1973 | Hecker | 342/45 |
| 3,945,006 | 3/1976 | Cleeton | 342/45 |
| 4,014,482 | 3/1977 | Esker et al. | 244/3.13 |
| 4,144,534 | 3/1979 | Prickett et al. | 342/45 |
| 4,164,165 | 8/1979 | Bean et al. | 89/134 |
| 4,194,201 | 3/1980 | Stein | 342/45 |
| 4,234,141 | 11/1980 | Miller, Jr. et al. | 244/3.13 |
| 4,249,265 | 2/1981 | Coester | 455/604 |
| 4,322,729 | 3/1982 | Honold et al. | 342/45 |
| 4,361,911 | 11/1982 | Buser et al. | 455/604 X |
| 4,406,429 | 9/1983 | Allen | 244/3.11 |
| 4,424,943 | 1/1984 | Zwirn et al. | 244/3.11 |
| 4,464,974 | 8/1984 | Goda | 89/41 L |
| 4,763,361 | 8/1988 | Honeycutt et al. | 455/605 |

FOREIGN PATENT DOCUMENTS

| | | | |
|---|---|---|---|
| 3113154 | 12/1982 | Fed. Rep. of Germany | 455/604 |
| 3150173 | 7/1983 | Fed. Rep. of Germany | |
| 2535467 | 5/1984 | France | 455/604 |
| 1429289 | 3/1976 | United Kingdom | 455/604 |

*Primary Examiner*—Mark Hellner

[57] ABSTRACT

An electro-optical IFF system easily integrable into existing laser systems uses a laser to illuminate a potential target platform. The potential target, if friendly, has apparatus for returning to the illuminating platform a return beam which has the same signature but is delayed with respect to the illuminating beam by a predetermined time interval. If the illuminating platform sees a return beam with the same signature in the proper time frame, an indication is generated that the target is friendly. A friendly target platform contains apparatus for comparing the signature of the illuminating beam to a stored reference signature, and for providing a friendly-illumination indication and activating the return beam only if the signatures match.

8 Claims, 1 Drawing Sheet

ELECTRO-OPTICAL IFF SYSTEM

FIELD OF THE INVENTION

This invention relates to identification-friend-or-foe (IFF) systems, and more particularly to an electro-optical system capable of accurate beyond-line-of-sight operation.

BACKGROUND OF THE INVENTION

Numerous systems have previously been proposed to allow weapon platform operators to determine whether a potential target is friendly or unfriendly. In general, such systems have used electromagnetic means, such as radio and radar, which have several practical disadvantages. For one, electromagnetic radiation spreads over a wide area and makes correlation of specific targets in a group of targets difficult. For another, electromagnetic radiation is subject to jamming and interference. Finally, electromagnetic radiation can be detected from many directions, and thereby gives away the location of the weapon platform.

For all of the foregoing reasons, it has been the custom in practice to use visual identification whenever practical. Because line-of-sight observation is often limited by atmospheric conditions, however, the visual identification approach unnecessarily reduced the effectiveness of the weapon platform.

The prior art includes the following references: U.S. Pat. No. 4,014,482 which shows a beam rider guidance system; U.S. Pat. No. 4,164,165 which shows a firing safety system inhibiting fire in unsafe directions; U.S. Pat. No. 4,234,141 which allows a beam rider system in which missile position information is reflected back to the launch site; U.S. Pat. No. 4,406,429 which shows a system for tracking, by means of a night sight, a missile carrying an IR transmitter; U.S. Pat. No. 4,424,943 which shows a missile identification and tracking system involving a missile-mounted pulsed laser in addition to IR; U.S. Pat. No. 4,464,974 which involves laser tracking and guidance of a simulated missile; and German published application 3,150,173 which describes a missile-mounted IFF system for interrogating a target upon approach thereto, and disarming the missile if the target responds with a predetermined code.

SUMMARY OF THE INVENTION

The present invention solves the above-stated problems of the prior art by providing an IFF system based on the delayed return, by the potential target, of a laser beam signal transmitted by the weapon platform. The returned signal is delayed by a known time interval which identifies the target as friendly, but is otherwise unchanged in all respects except amplitude.

The use of infrared lasers makes it possible to illuminate the target through many atmospheric conditions which defeat visual observation, and the narrow angle of a laser beam makes is possible to illuminate an individual target in a group of targets without being seen by any other target or detection platform.

The invention is relatively inexpensive to use, as it basically involves only the addition of IFF electronics to existing laser systems.

DESCRIPTION OF THE PREFERRED EMBODIMENT

Figure 1:
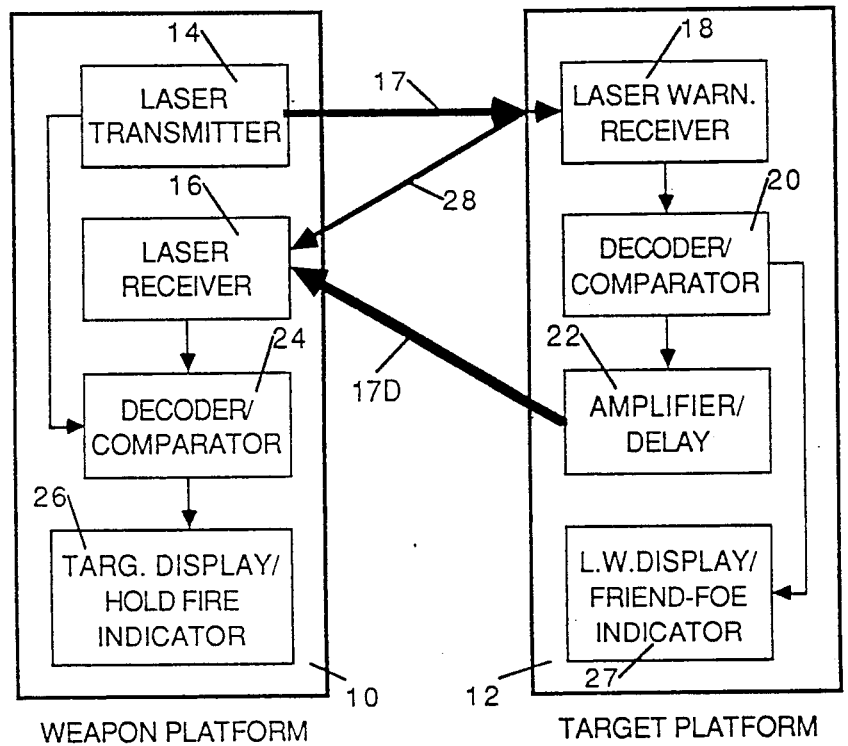
FIG. 1 is a block diagram illustrating the components of the inventive system.

FIG. 1 illustrates the system of this invention in terms of a weapon platform 10 and a friendly target platform 12. The weapon platform 10 includes a conventional laser transmitter 14 and a conventional laser receiver 16. Following acquisition of the target by any conventional means (not shown), the laser transmitter 16 transmits to the target platform 12 a laser beam 17 that has frequency and coding characteristics which the target platform 12 will recognize as friendly.

The conventional laser warning receiver 18 in the target platform 12 receives the laser signal 17 and feeds it through a decoder/comparator 20 to an amplifier and delay circuit 22 which returns an identical laser signal 17D, amplified and delayed by a selectable time interval, to the weapon platform 10.

In accordance with the invention, the decoder/comparator 20 decodes the parameters and/or encoding of the laser beam 17 received by the laser warning receiver 18 and compares them to pre-stored criteria. If the comparison indicates that the received laser beam 17 is from a friendly source, the friend-foe indicator 27 on the target platform 12 indicates that fact to the platform operator to prevent the operator from taking evasive or aggressive action.

At the weapon platform 10, the delayed return signal 17D is received by the laser receiver 16 and is fed to a decoder/comparator 24, which also receives a portion of the signal 17 transmitted by the laser transmitter 14. The decoder/comparator 24 decodes the parameters and/or encoding of both the transmitted and the received signal. As described in more detail below, the receiver 16 may see more than one return signal, but if it does see a return signal which is identical to the transmitted signal but occurs within a specified narrow time interval subsequent to the transmission, then it sends a signal to the hold-fire indicator 26 which indicates to the platform operator that the illuminated target is friendly.

The system of FIG. 1 is usable in several distinct environments. If the weapon platform 10 contains rangefinder equipment, the laser receiver 16 will see two return signals: a skin reflection 28 whose timing relative to the transmitted signal gives range information to the decoder/ comparator 24, and (if the target is friendly) a second, delayed return 17D in an acceptable time frame which identifies the target as friendly. The existing rangefinder receiver detector circuitry need only be modified to include circuitry to compare the signatures of the transmitted and received beams during a specific predetermined time frame.

If the weapon platform 10 contains laser designator equipment, an existing laser designator seeker may be used as a receiver, subject only to the addition of comparison and timing circuitry as described above.

If the weapon platform 10 contains laser beamrider equipment (which is typically equipped with a laser beam projector and a forward-looking infrared (FLIR) or night sight receiver), the FLIR or night sight receiver of the weapon platform 10 can readily be modified at moderate cost to detect and compare the return beam 17D without the need for a separate laser receiver.

In both cases, the laser warning receiver/detector circuitry on the target platform would need to be modified to store and evaluate the signature of the received beam 17, and the delay amplifier 22 would need to be added to the existing laser warning equipment.

Figure 2:
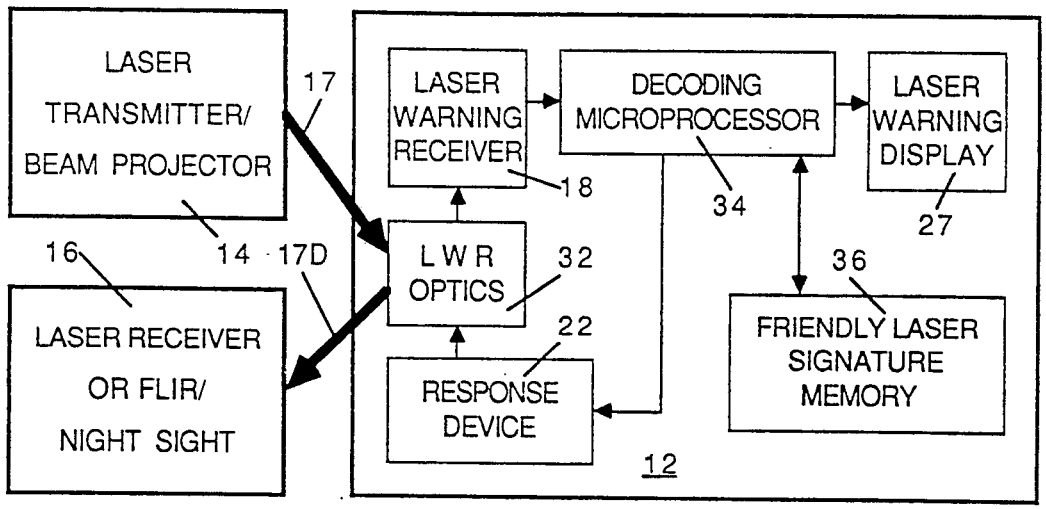
FIG. 2 is a block diagram illustrating the target electronics in greater detail.

FIG. 2 shows the target platform portion of the system of this invention in somewhat greater detail. The incoming laser beam 17 from the laser transmitter or beam projector 14 is received by the laser warning receiver 18 through the LWR optics 32. The optics 32 and receiver 18 are conventionally equipped to receive the incoming laser beam 17 and display its direction of arrival to the target platform operator.

The received signal is fed to a microprocessor 34 which decodes its signature (i.e. its identifying characteristics such as frequency, modulation, pulse rate, etc.) and compares it to friendly signature indicia stored in a memory 36. If the received and stored signatures match, the laser warning display 27 is supplied with a signal identifying the laser illumination as friendly, and the received and delayed signal is applied to a response device 22 which transmits an amplified duplicate of the received signal after a predetermined selectable delay. Preferably, the delayed laser beam 17D returned by the response device 22 is transmitted through the same LWR optics 32 as the received beam 17 so as to be returned precisely to the originating location of the received beam.

It will be seen that the present invention provides a reliable, relatively inexpensive IFF system which is largely impervious to sight-restricting atmospheric conditions, eliminates target correlation problems, preserves the location security of the weapon platform, and makes use in large part of existing equipment on both the weapon platform and the target platform.

I claim:
1. An IFF system, comprising
   a) first and second equipment;
   b) transmitting means in said first equipment for transmitting to said second equipment an illuminating laser beam having a predetermined signature;
   c) response means in said second equipment for transmitting to said first equipment a return beam having the same signature but delayed from said illuminating beam by a predetermined time interval;
   d) receiving means in said first equipment for receiving said return beam; and
   e) detector/comparator means connected to said receiving means for comparing the timing and signature of said illuminating beam, and producing an indication based on said composition.
2. The system of claim 1, further comprising:
   f) laser warning receiver means associated with said second equipment for receiving said illuminating beam;
   g) second detector/comparator means connected to said laser warning receiver means for detecting the signature of said illuminating beam, comparing it to predetermined signature criteria stored in said second equipment, and activating said response means if said illuminating beam signature matches said criteria.
3. The system of claim 2, further comprising:
   h) laser warning display means connected to said second decoder/comparator means for producing an indication when said illuminating beam signature matches said criteria.
4. The system of claim 2, in which said laser warning receiver means include optics through which said illuminating beam is received, and in which said return beam is returned through said optics.
5. The system of claim 1, further comprising:
   f) target display means connected to said detector/comparator means for producing an indication when said detector/comparator means detects a return beam of predetermined timing and signature.
6. The system of claim 1, in which said receiving means is a laser receiver.
7. The system of claim 1, in which said receiving means is a FLIR or night sight receiver.
8. The system of claim 1, in which said receiving means is a laser designator seeker.

* * * * *